June 20, 1950     T. H. THOMPSON     2,512,185
BEARING
Filed May 21, 1947
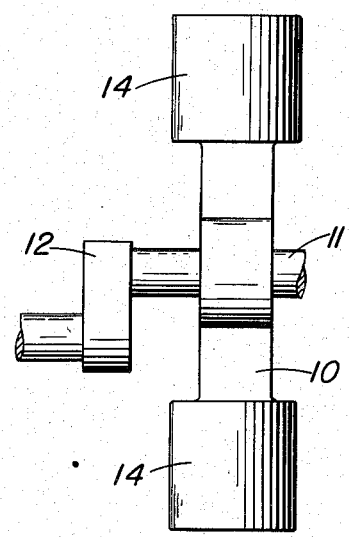
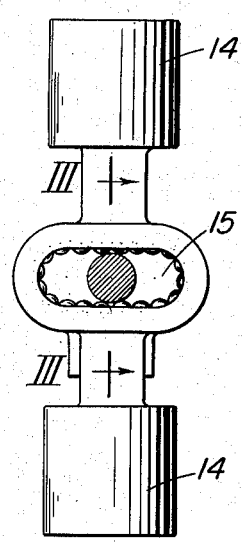
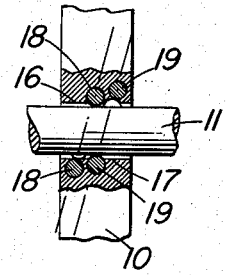
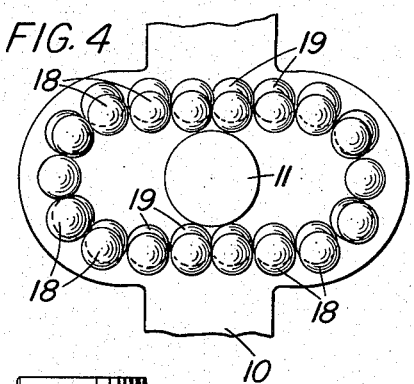
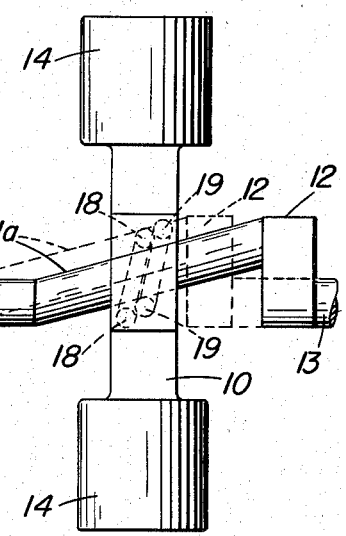
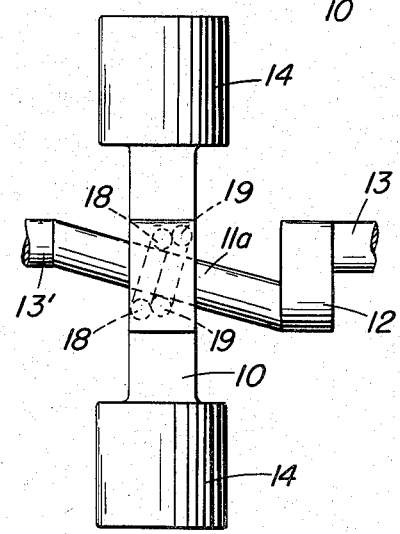
Inventor
Tom H. Thompson
By his attorneys
Howson and Howson Patented June 20, 1950

2,512,185

UNITED STATES PATENT OFFICE 2,512,185

BEARING

Tom H. Thompson, Mamaroneck, N. Y., assignor to Thompson-Wade Corporation, Detroit, Mich., a corporation of Michigan Application May 21, 1947, Serial No. 749,617

3 Claims. (Cl. 74—50)

This invention relates to a bearing, and more particularly a bearing between members which oscillate with respect to each other. The invention is especially useful in connection with apparatus for converting rotary motion into reciprocating rectilinear motion of controlled amplitude, to which use, however, it is not restricted.

In bearings wherein a rotating part has translatory as well as rotary motion within a bearing member, undesirable friction losses result where the rotating part is simultaneously in contact with opposite surfaces in the bearing member. If such simultaneous contact is not made, lost motion results, usually accompanied by hammering which may ruin the bearing. Anti-friction elements applied to the rotating part are of no help because of the dual contact between the rotating part and the bearing member. Furthermore, one or more trains of anti-friction or rolling elements, as rollers or balls, applied around the bearing member in the usual manner, are of little avail because the translatory motion of the rotating part tends to force opposite rolling elements ahead of it until they bunch up and bear upon each other, thereby retarding their turning movement and hampering their function.

I have now found that anti-friction elements may be applied to the bearing member of such a bearing in a manner to provide satisfactory anti-friction engagement between the rotating part and the bearing member. According to the invention, two continuous trains of rotating bearing elements are provided which encircle the inside surfaces of the bearing member, the elements of each train projecting beyond only one of two opposite inner faces of the bearing element opposite each other. Thus, the rotating part is held between opposite bearing elements each of which is a unit of an independent train. It is therefore impossible for translatory motion of the rotating part to force the rolling bearing elements to bunch up and bear upon each other.

The invention is shown by way of illustration in its application to a Scotch yoke in the accompanying drawings, in which Fig. 1 is an elevation of a crank-operated Scotch yoke for reciprocating a pair of plungers;

Fig. 2 is an elevation of the apparatus shown in Fig. 1 as viewed from the right, and illustrating the application of the invention thereto;

Fig. 3 is a broken mid-section taken on the line III—III of Fig. 2;

Fig. 4 is an enlarged phantom view showing the outline of the yoke and the relation of the crank pin to the anti-friction balls with which it coacts;

Fig. 5 is an elevation of a variable-stroke, crank-operated Scotch yoke constructed and arranged according to the invention; and Fig. 6 is an elevation of the apparatus shown in Fig. 5 with the crank in a different position.

In the embodiment of the invention which is illustrated in Figs. 1 to 4 inclusive of the drawings, there is shown a Scotch yoke 10 which is reciprocated by a crank pin 11, carried by a crank 12 which is rotated by a shaft 13. The Scotch yoke here shown has pistons 14, 14 on its opposite ends and reciprocates these pistons in like direction as the rotary motion of the shaft 13 is converted into reciprocating rectilinear motion in the yoke.

According to well-known Scotch yoke construction, the crank pin 11 extends through a transverse opening 15 in the yoke. As the shaft 13 rotates, the crank pin bears upon one major inside surface 16 of the yoke within the opening 15 to move the yoke in one direction, and then bears upon the opposite major inside surface 17 of the yoke within the opening to move the yoke in the opposite direction. The transverse opening 15 is, of course, of sufficient length to prevent the crank pin 11 from coming in contact with its ends.

In order that translatory motion of the crank pin along the major inside surfaces 16 and 17 of the yoke may not result in unnecessary friction losses, the invention contemplates the provision of anti-friction elements along each of these surfaces. In order that the crank pin may be constantly in contact with each of the major inside surfaces of the yoke, and thereby avoid lost motion and hammering, the distance between the major inside surfaces 16 and 17 and the projection of the anti-friction elements beyond them is made to accommodate the crank pin 11 exactly. Thus, the anti-friction elements insure point or line contact between the crank pin and the bearing member on diametrically opposite sides of the crank pin. Finally, in order that translatory motion of the crank pin while in contact with anti-friction elements on opposite major inside surfaces of the yoke may not force both trains of anti-friction or roller elements ahead of it until they bunch up and bear upon each other at the ends of the transverse opening 15, an important feature of the invention is the provision of two continuous trains of rotating elements: one for each of the major inside surfaces of the Scotch yoke.

Accordingly, as illustrated in Figs. 3 and 4, two continuous trains of balls encircle the inside surfaces of the yoke, the balls of one train providing a bearing on one side of the yoke, and the balls of the other train providing a bearing on the opposite side of the yoke. In the illustrated embodiment, a continuous train of balls 18 encircles the inside surfaces of the yoke 10. The elements or balls 18 of this train project appreciably beyond and centrally of the major inside surface 16 of the yoke and lie substantially beneath the opposite major inside surface 17. Correspondingly, a continuous train of balls 19 encircles the inside surfaces of the yoke and the balls of this train project appreciably beyond and centrally of the major inside surface 17 of the yoke and lie substantially beneath the opposite major inside surface 16. To accomplish this positioning, the races in which the trains of balls move pass around the ends of the transverse openings 15 at an angle, as best seen in Fig. 3. The balls which are not in a position to contact the crank pin thus travel in a race section which is offset from the major central plane of the yoke next to the balls which are in a position to contact the crank pin and just beneath the major inside surface of the yoke. Little more space is therefore necessary for this arrangement than would be required for an ordinary bearing. Translatory movement of the crank pin 11 may move the balls, through which it is in continuous contact with each major inside surface of the yoke, freely in a separate race without any tendency to bunch up or bear unduly upon each other. The pin is always in contact with freely moving opposite balls along the center line of the yoke.

The crank pin has point contact only with the balls with which it coacts, and the balls are free to follow around the races in which they move with a minimum of friction. There is therefore but slight tendency for the turning crank pin to cause the Scotch yoke to bear upon its guides while being reciprocated back and forth.

The embodiment shown in Figs. 5 and 6 illustrates the application of the invention to an apparatus for converting rotary motion into reciprocating rectilinear motion of adjustable amplitude. In this embodiment, the shaft 13 is illustrated as movable axially in order to control the amplitude of the Scotch yoke reciprocation. See Fig. 5. The crank 12 is identical with the crank employed in the previously described embodiment, but the crank pin 11a is inclined from the outer end of the crank towards the axis of the shaft and terminates in a shaft 13′ which is coaxial with the shaft 13. Thus, the crank pin 11a is inclined from parallelism with the shaft 13. The crank pin 11a extends through the Scotch yoke at an angle and bears upon balls 18 extending longitudinally of one major inside surface of the yoke and upon balls 19 extending longitudinally of the opposite major inside surfaces of the yoke, exactly as the balls 18 and 19 are arranged in the embodiment previously described. Thus, by rotating the shaft 13 and thereby turning the crank 12, the crank pin 11a is rotated in the Scotch yoke and reciprocates the yoke as does the crank pin 11 previously described, being constantly in contact with a train of balls 18 and with an opposite train of balls 19. Because a single row of bearing balls extends centrally for the length of each major inside surface of the yoke, it is possible to vary the angle of the crank pin with respect to the central plane of the yoke. Fig. 5 illustrates one position of the pin; Fig. 6, the opposite position. As will be obvious, the amplitude of reciprocation of the Scotch yoke will depend upon the distance of the yoke from the crank 12. When closely adjacent the crank, the amplitude will be at a maximum, because the crank pin at this point describes a circle, the radius of which is substantially equal to the length of the crank. On the other hand, contact between the Scotch yoke and the crank pin 11a adjacent to the co-axial shaft 13′ will produce a minimum amplitude which may become substantially zero, because at that point the radius of the crank pin's rotation vanishes.

The broken line position shown in Fig. 5 illustrates the condition which results when the shaft 13 is moved axially until the crank 12 is closely adjacent the Scotch yoke. In this position, the amplitude of the Scotch yoke reciprocation is at a maximum.

From the foregoing, it will be clear that the present invention eliminates lost motion and hammering in the operation of a bearing wherein a rotating part has translatory motion as well as rotary motion within a bearing member, as a Scotch yoke. The invention further eliminates the major part of the friction which has heretofore made the use of such bearings, including Scotch yokes, exceedingly inefficient. Furthermore, by providing a single row of bearing balls on either side of an inclined crank shaft in the central plane of the Scotch yoke, it is possible to use an inclined crank shaft in such a connection and to adjust the amplitude of the yoke's reciprocation simply by displacing the operating shaft axially.

The forms and embodiments here described and illustrated are presented merely to indicate how the invention may be applied. Other forms and embodiments of the invention which are within the proper scope of the appended claims will, of course, suggest themselves to those skilled in the art.

What I claim is:

1. Apparatus for converting rotary motion into reciprocating rectilinear motion of controlled amplitude, said apparatus comprising a Scotch yoke, two trains of balls encircling the inside surfaces of said yoke, one train of balls projecting beyond one major inside surface of said yoke along the central plane of said yoke which extends longitudinally of its major inside surfaces, and the other train of balls projecting beyond the opposite major inside surface of said yoke in the same central plane, neither train of balls projecting beyond two major inside surfaces of said yoke, a shaft disposed perpendicularly to the central plane which extends longitudinally of the major inside surfaces of said yoke, said shaft being movable toward and away from the opening in said yoke, a crank on said shaft, and a crank pin inclined from the outer end of said crank toward the axis of said shaft and extending through said Scotch yoke in contact with the opposite major inside surfaces thereof through said two trains of balls, whereby rotation of said shaft reciprocates said yoke and axial movement of said shaft controls the amplitude of its reciprocation.

2. Apparatus for converting rotary motion into reciprocating rectilinear motion of controlled amplitude, said apparatus comprising a shaft, a crank on said shaft, and a crank pin carried by said crank inclined from parallelism with said shaft and extending through said Scotch yoke, in combination with two trains of balls encircling the inside surface of said yoke, each train of balls projecting centrally along but one inside major surface of said yoke opposite the other train and in contact with said inclined crank pin, the points of contact of said balls with said pin defining a plane perpendicular to the axis of revolution of said crank pin, whereby rotation of said shaft reciprocates said yoke and axial movement of said shaft controls the amplitude of its reciprocation.

3. Apparatus for converting rotary motion into reciprocating rectilinear motion of controlled amplitude, said apparatus comprising a shaft, a crank on said shaft, and a crank pin inclined from the outer end of said crank toward the axis of said shaft and extending through said Scotch yoke, in combination with two trains of balls encircling the inside surfaces of said yoke, each train of balls projecting centrally along but one inside major surface of said yoke opposite the other train and in contact with said inclined crank pin, the points of contact of said balls with said pin defining a plane perpendicular to the axis of revolution of said crank pin, whereby rotation of said shaft reciprocates said yoke and axial movement of said shaft controls the amplitudes of its reciprocation.

TOM H. THOMPSON.

REFERENCES CITED

The following references are of record in the file of this patent:

UNITED STATES PATENTS

| Number | Name | Date |
| --- | --- | --- |
| 547,853 | Johannson | Oct. 15, 1895 |
| 908,605 | Olin | Jan. 5, 1909 |
| 977,480 | Twombly | July 11, 1911 |
| 2,008,623 | McGogy | July 16, 1935 |

FOREIGN PATENTS

| Number | Country | Date |
| --- | --- | --- |
| 730,922 | France | Aug. 26, 1932 |